May 31, 1932. W. A. POULIOT 1,860,871

SAFETY WRENCH

Filed Nov. 6, 1930

INVENTOR
Wilfred A. Pouliot
BY
Gardner W. Pearson
ATTORNEY.

Patented May 31, 1932

1,860,871

UNITED STATES PATENT OFFICE

WILFRED A. POULIOT, OF LOWELL, MASSACHUSETTS

SAFETY WRENCH

Application filed November 6, 1930. Serial No. 493,711.

This invention relates to wrenches of the safety or relief type. Such wrenches are so made and so adjusted that if more than a predetermined pressure is applied, certain parts will yield or turn thereby preventing more than a maximum pressure being applied to the screw or bolt head.

The purpose of this invention is to make it impossible to twist off the head or do other damage to the screw or bolt.

I am aware that wrenches have been devised with the above idea in view and I claim as my principal improvement the use of a ball which engages one of a number of cup shaped depressions in a revoluble head, such ball being pressed into one of such depressions by a spring which is preferably adjustable.

Other features of my device are the use of an indicator pin which travels in an indicator slot thereby indicating the maximum amount of presesure which can be applied to the screw or bolt head before the head turns.

Other features are the special arrangement of parts whereby all are arranged in an adjusting arm and the adjustment can be altered from the end thereof.

In my preferred type, no other tool such as a wrench or screw driver or pin is required for changing the adjusted pressure.

The advantages of my device are that it is compact and lighter, as the guide arm can be used as a handle, and it is easily made and repaired.

When a ball wears, it can readily be replaced by a new one and if oil or dirt gets into the parts, particularly the ball cups, the accuracy of the wrench release mechanism is not affected.

In the drawings, Fig. 1 is a plan view of my wrench.

Figure 1:
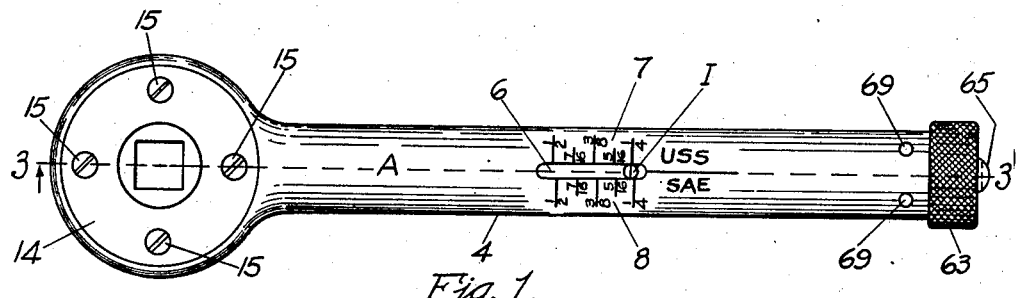
Figure 2:
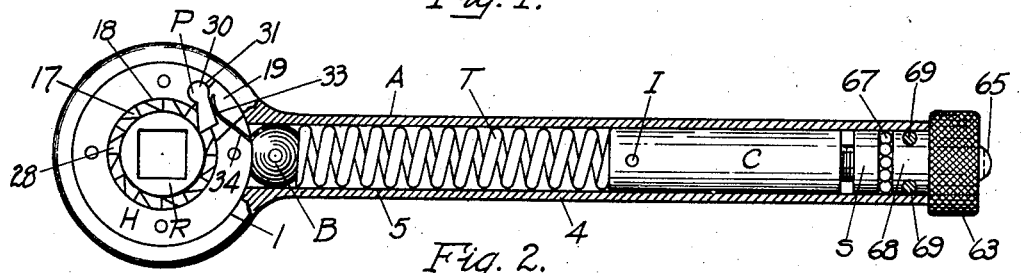
Fig. 2 is a plan view partly in section with the holding plate removed.
Figure 3:
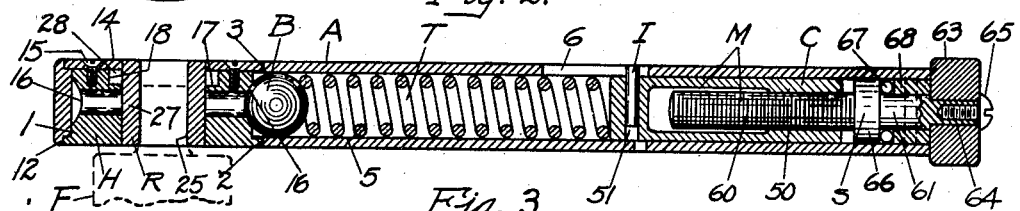
Fig. 3 is a vertical sectional view on the line 3—3 of Fig. 1 looking in the direction of the arrow.
Figure 4:
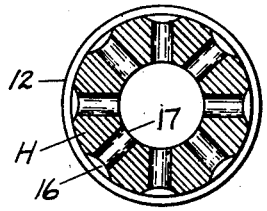
Fig. 4 is a sectional view of the head on line 4—4 of Fig. 5.
Figure 5:
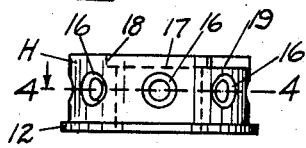
Fig. 5 is an elevation of the head.
Figure 6:
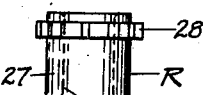
Fig. 6 is an elevation of the ratchet hub.

In the drawings, A represents what I will call a head holder in which is an annular head bearing 1 for the head H. As shown, at what I might call the bottom, is an annular groove 2 somewhat larger than 1 and at the top an annular plate groove 3 into which fits a plate 14 which by means of screws 15, 15, 15, 15 is fastened to head H.

4 is a guide arm which is preferably tubular and, as shown, is an integral part of head holder A. It is obvious, however, that it might be a separate piece of metal screwed, riveted, or welded to the head proper.

5 is a longitudinal passage through arm 4 and 6 is a longitudinal indicating slot which extends out from the inside.

7 and 8 represent scales which, as shown, indicate where the indicator pin I should be when operating on a screw or bolt of a certain standard size as one-half inch, three-eights inch, etc. those shown being known as the United States Standard on one side and Society of Automotive Engineers on the other side.

H is a disc shaped head revoluble in the head bearing 1 having, as shown, at the bottom a projecting annular rim 12 and being held in place at the top by plate 14.

Around its periphery are a plurality of spaced cup shaped depressions 16 and interiorly it has a ratchet hub bearing 17, an annular ratchet tooth recess 18 and a pawl recess 19.

R is a hub having a body 27, revoluble in hub bearing 17, and externally extending ratchet teeth 28.

P is a pawl pivoted at 30 in the part 31 of pawl recess 19 and normally is caused to engage the ratchet teeth 28 by means of a pawl spring 33 positioned in the part 34 of pawl recess 19. As shown, this construction of pawl and ratchet allows the ratchet to turn only in one direction.

This hub R is shown as having a square socket holder 25 to receive the square shank of any ordinary form of socket such as F, shown in dotted lines. It can, therefore, turn this socket F in one direction only.

B is a ball positioned in arm passage 5 and normally is held in engagement with the periphery of head H by means of pressure of indicator spring T. This ball normally rests in one of the cup shaped depressions such as 16 in the periphery of head H.

C is an adjusting screw carrier which is shown as of tubular form and slidable in arm passage 5. Between it and ball B, is the compression spring T.

This carrier has interior threads 50 with which the threads 60 on adjusting screw S engage and has a pin hole 51 into which is driven indicator pin I the end of which extends out into but preferably not through the indicating slot 6.

S is an adjusting screw the threaded end 60 of which engages 50 in the carrier and the other end of which 61 terminates proximate the open end of arm passage 5.

As shown, projecting from the end of arm 4 on the end of screw S is a knurled thumb nut or handle 63 which fits over the square end 64 of screw S and is held in place by a screw 65.

Preferably, screw S has a projecting collar 66 which is so formed as to serve as one part of a bearing for the balls 67 which are held in place by a ball holder 68 which in turn is kept from pulling out by the two pins 69, 69.

These parts provide means, which I will indicate generally by M, to allow screw S to turn but to hold it in position.

Figure 7:
Fig. 7 is a vertical sectional view similar to Fig. 3 showing the end of an adjusting arm of a modified construction.
Figure 8:
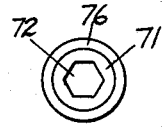
Fig. 8 is a view from the free end of an arm such as shown in Fig. 7.

Instead of the means to hold the screw in position, but to allow it to turn, I may, as shown in Fig. 7, provide a screw 71 which has at the end a hexagonal recess 72 and an annular groove 73 through each side of which and through handle 76 are driven the pins 77, 77.

With this construction, the adjusting screw cannot be turned except by the use of a special tool with a pin which fits into the hexagonal recess 72.

Figure 9:
Fig. 9 is a view similar to Fig. 8 of a modification.

In Fig. 9 is shown the end of an adjusting screw such as 81 in which there is a screw driver slot 82 whereby the adjustment can be made with a screw driver.

Figure 10:
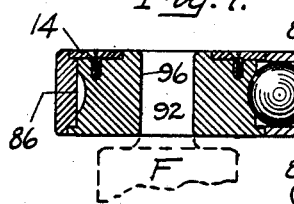
Fig. 10 is a vertical sectional view similar to Fig. 3 of another modified construction.
Figure 11:
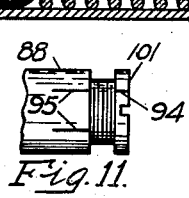
Fig. 11 is an elevation of the end of an arm similar to that shown in Fig. 10.

In Fig. 10, I show a head holder 85 with a head bearing 86 and a guide arm 87 which are the same as in the first described construction except that in the inside of the arm at 88 are screw threads with which threads 89 of adjusting screw means 90 engage.

The adjusting screw means 90 take the place of the screw carrier C and screw S of the first construction and include a smooth shank 100, threads 89 and a projecting head 101 which may have a screw driver turning slot 91. If desired, on head 101 there may be a mark such as 94 and proximate this near the end of arm 88 there may be other scale marks 95.

This arrangement permits of a limited adjustment of compression spring T, the amount being determined by the relation of mark 94 to the marks 95.

The ball B and spring T are the same as in the other construction one end of spring T resting against the end of the adjusting screw means 90 and the other bearing against ball B.

There is no ratchet and there is no pawl, however, but the head 92 is revoluble in head bearing 86. It may be held in place as by a plate 14.

As shown, head 92 has a square opening 96 which can be fitted directly over the head of a screw or bolt without the use of any detachable socket. Obviously it could be used to receive the shank of a socket such as F, however.

Figure 12:
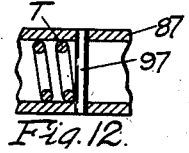
Fig. 12 is a sectional detail of another modification.

In some places it may be desirable that the spring T should be set for a permanent adjustment and for use with only one size of bolt. In that case, as shown in Fig. 12, the construction may be substantially the same as shown in Fig. 10 except that the adjusting screw means is entirely omitted. Its place is taken by a pin 97 driven through the barrel 87 in any desired position so that one end of spring T can rest against it.

I claim:

1. The combination in a socket wrench of a head holder having a head bearing from which extends a guide arm through which is a longitudinal passage, said arm having a longitudinal indicating slot; with a disc shaped head revoluble in the head bearing and having in its periphery a plurality of spaced cup shaped depressions and interiorly having a hub bearing, a ratchet teeth recess and a pawl recess; a hub revoluble in the hub bearing said hub having a socket and external ratchet teeth; a spring pressed pawl pivoted in the pawl recess and in engagement with the hub ratchet teeth; a ball positioned in the arm passage in engagement with the periphery of said head; an adjusting screw carrier slidable in the arm passage, said carrier having interior threads; an adjusting screw in engagement with said carrier threads, said screw terminating proximate the open end of the arm passage and including turning means at its outside end; means to allow it to turn to hold the adjusting screw longitudinally in position; an indicator pin which extends from the adjusting screw carrier out through the indicating slot; and a compression spring in said passage between the ball and the end of the adjusting screw carrier.

2. The combination in a socket wrench of a head holder having a head bearing from which extends a guide arm through which is a longitudinal passage, said arm having a longitudinal indicating slot; with a disc shaped head revoluble in the head bearing and having in its periphery a plurality of spaced cup shaped depressions and interiorly having a hub bearing; a hub revoluble in the hub bearing said hub having a socket and ratchet teeth; a spring pressed pawl in engagement with the hub ratchet teeth; a ball positioned in the arm passage in engagement with the periphery of said head; an adjusting screw carrier slidable in the arm passage, said carrier having threads; an adjusting screw in engagement with said carrier threads, said screw terminating proximate the open end of the arm passage and including turning means at its outside end; means to allow it to turn but to hold the adjusting screw longitudinally in position; an indicator pin which extends from the adjusting screw carrier out through the indicating slot; and a compression spring in said passage between the ball and the end of the adjusting screw carrier.

3. The combination in a socket wrench of a head holder having a head bearing from which extends a guide arm through which is a longitudinal passage, said arm having a longitudinal indicating slot; with a disc shaped head revoluble in the head bearing and having in its periphery a plurality of spaced cup shaped depressions and interiorly having a hub bearing; a hub having a socket and revoluble only in one direction in the hub bearing; a ball positioned in the arm passage in engagement with the periphery of said head; an adjusting screw carrier slidable in the arm passage, said carrier having threads; an adjusting screw in engagement with said carrier threads, said screw terminating proximate the open end of the arm passage and including turning means at its outside end; means to allow it to turn but to hold the adjusting screw longitudinally in position; an indicator pin which extends from the adjusting screw carrier out through the indicating slot; and a compression spring in said passage between the ball and the end of the adjusting screw carrier.

4. The combination in a socket wrench of a head holder having a head bearing from which extends a guide arm through which is a longitudinal passage; with a disc shaped head revoluble in the head bearing and having in its periphery a plurality of spaced cup shaped depressions and interiorly having a hub bearing; a hub having a socket and revoluble only in one direction in the hub bearing; a ball positioned in the arm passage in engagement with the periphery of said head; a spring stop in said passage; and a compression spring in said passage between the ball and spring stop.

5. The combination in a socket wrench of a head holder having a head bearing from which extends a guide arm through which is a longitudinal passage; with a disc shaped head revoluble in the head bearing and having in its periphery a plurality of spaced cup shaped depressions and interiorly having a hub bearing; a hub having a socket and revoluble only in one direction in the hub bearing; a ball positioned in the arm passage in engagement with the periphery of said head; adjusting screw means movable in said passage and which terminates proximate the open end of the passage, said screw means comprising turning means at its outside end; indicating means visual from the outside associated with the adjusting screw means; and a compression spring in said passage between the ball and the end of the adjusting screw means.

WILFRED A. POULIOT.